United States Patent
Diller et al.

(10) Patent No.: US 10,121,153 B1
(45) Date of Patent: Nov. 6, 2018

(54) ONLINE ESCROW SERVICE

(75) Inventors: Jonathan Paul Diller, Soquel, CA (US); Rajasekhar L. Kovuru, Sunnyvale, CA (US); James Kang-Koog Lee, San Jose, CA (US)

(73) Assignee: ELANCE, INC., Mountain View, CA (US)

( * ) Notice: Subject to any disclaimer, the term of this patent is extended or adjusted under 35 U.S.C. 154(b) by 0 days.

(21) Appl. No.: 13/109,818

(22) Filed: May 17, 2011

Related U.S. Application Data

(62) Division of application No. 12/287,997, filed on Oct. 14, 2008.

(60) Provisional application No. 60/999,147, filed on Oct. 15, 2007.

(51) Int. Cl.
| | | |
|---|---|---|
| G07B 17/00 | (2006.01) | |
| G07F 19/00 | (2006.01) | |
| G06Q 30/02 | (2012.01) | |
| A01K 5/02 | (2006.01) | |
| G06F 17/50 | (2006.01) | |
| H04M 15/00 | (2006.01) | |
| G06Q 40/00 | (2012.01) | |
| G06Q 20/10 | (2012.01) | |

(52) U.S. Cl.
CPC ............. *G06Q 30/02* (2013.01); *G06Q 20/10* (2013.01)

(58) Field of Classification Search
CPC ..... G06Q 30/02; G06Q 20/10; G06Q 30/0601
USPC .................. 705/25–31, 34, 38, 39
See application file for complete search history.

(56) References Cited

U.S. PATENT DOCUMENTS

| | | | |
|---|---|---|---|
| 4,703,325 A | 10/1987 | Chamberlin et al. | 340/825.17 |
| 4,799,156 A | 1/1989 | Shavit et al. | 705/26 |
| 5,008,853 A | 4/1991 | Bly et al. | 715/751 |
| 5,220,657 A | 6/1993 | Bly et al. | |
| 5,548,506 A | 8/1996 | Srinivasan | 709/206 |
| 5,557,515 A | 9/1996 | Abbruzzese et al. | 364/401 |

(Continued)

FOREIGN PATENT DOCUMENTS

| | | |
|---|---|---|
| EP | 0 952 536 A1 | 10/1999 |
| WO | WO 01/73645 A1 | 10/2001 |

OTHER PUBLICATIONS morebusiness.com, "How to Write Winning Business Proposals: Writing Strategies," cited in Office Action dated Oct. 6, 2011, <http://www.morebusiness.com/running_your_business/management/v1n11.brc>, published Aug. 1, 1998.

(Continued)

*Primary Examiner* — Talia F Crawley
(74) *Attorney, Agent, or Firm* — Haverstock & Owens LLP

(57) ABSTRACT

A method of using an escrow service within a services exchange medium allows a buyer to deposit asset for a project into escrow. The asset is released to a service provider once the project is completed and approved by the buyer. The buyer and the service provider are able to ascribe escrow status to the project before starting the project. The buyer is able to upon posting the project. The service provider is able to while bidding on the project even if the buyer had not ascribe the escrow status to the project upon posting. The escrow service includes a tax filing feature and a dispute assistance feature. The tax filing feature issues 1099 U.S. federal tax forms on behalf of U.S. buyers to the I.R.S. after each tax year. The dispute assistance feature facilitates discussion between the service provider and the buyer to foster a resolution of a dispute.

20 Claims, 5 Drawing Sheets

(56) References Cited

U.S. PATENT DOCUMENTS

| | | | |
|---|---|---|---|
| 5,592,620 A | 1/1997 | Chen et al. ............... 709/223 |
| 5,664,115 A | 9/1997 | Fraser ........................ 705/37 |
| 5,715,402 A | 2/1998 | Popolo ...................... 705/37 |
| 5,732,400 A | 3/1998 | Mandler et al. ............. 705/26 |
| 5,794,207 A | 8/1998 | Walker et al. ............... 705/77 |
| 5,835,896 A | 11/1998 | Fisher et al. ............... 705/37 |
| 5,842,178 A | 11/1998 | Giovannoli ................ 705/26 |
| 5,862,223 A | 1/1999 | Walker et al. ............... 705/50 |
| 5,905,975 A | 5/1999 | Ausubel ..................... 705/37 |
| 5,924,082 A | 7/1999 | Silverman et al. .......... 705/37 |
| 5,949,976 A | 9/1999 | Chappelle .................. 709/224 |
| 5,956,715 A | 9/1999 | Glasser et al. |
| 5,966,130 A | 10/1999 | Benman, Jr. ................ 345/418 |
| 5,987,498 A | 11/1999 | Athing et al. ............... 709/203 |
| 6,009,154 A | 12/1999 | Rieken et al. ............ 379/114.12 |
| 6,041,307 A | 3/2000 | Ahuja et al. ................. 705/8 |
| 6,049,777 A | 4/2000 | Sheena et al. .............. 705/10 |
| 6,061,665 A | 5/2000 | Bahreman .................. 705/40 |
| 6,064,980 A | 5/2000 | Jacobi et al. ................ 705/26 |
| 6,078,906 A | 6/2000 | Huberman ................. 705/37 |
| 6,092,049 A | 7/2000 | Chislenko et al. |
| 6,101,482 A | 8/2000 | DiAngelo et al. .......... 705/26 |
| 6,119,101 A | 9/2000 | Peckover .................... 705/26 |
| 6,119,149 A | 9/2000 | Notani |
| 6,128,624 A | 10/2000 | Papierniak et al. |
| 6,141,653 A | 10/2000 | Conklin et al. ............. 705/80 |
| 6,154,731 A | 11/2000 | Monks et al. ............... 705/36 R |
| 6,161,099 A | 12/2000 | Harrington et al. ........ 705/36 R |
| 6,208,659 B1 | 3/2001 | Covindarajan et al. |
| 6,223,177 B1 | 4/2001 | Tatham et al. |
| 6,226,031 B1 | 5/2001 | Barraclough et al. ..... 348/14.13 |
| 6,233,600 B1 | 5/2001 | Salas et al. .................. 709/201 |
| 6,311,178 B1 | 10/2001 | Bi et al. ...................... 707/706 |
| 6,336,105 B1 | 1/2002 | Conklin et al. ............. 705/80 |
| 6,374,292 B1 | 4/2002 | Srivastava et al. .......... 709/206 |
| 6,385,620 B1 | 5/2002 | Kurzius et al. |
| 6,415,270 B1 | 7/2002 | Rackson et al. ............ 705/36 R |
| 6,415,284 B1 | 7/2002 | D'Souza et al. |
| 6,442,528 B1 | 8/2002 | Notani et al. ................ 705/9 |
| 6,484,153 B1 | 11/2002 | Walker et al. ............... 705/38 |
| 6,557,035 B1 | 4/2003 | McKnight .................. 709/224 |
| 6,564,246 B1 | 5/2003 | Varma et al. ............... 709/205 |
| 6,567,784 B2 | 5/2003 | Bukow ....................... 705/9 |
| 6,598,026 B1 | 7/2003 | Ojha et al. .................. 705/26 |
| 6,618,734 B1 | 9/2003 | Williams |
| 6,662,194 B1 | 12/2003 | Joao |
| 6,735,570 B1 | 5/2004 | Lacy et al. |
| 6,832,176 B2 | 12/2004 | Hartigan et al. ............ 702/178 |
| 6,859,523 B1 | 2/2005 | Jilk |
| 6,871,181 B2 | 3/2005 | Kansai |
| 6,931,385 B1 | 8/2005 | Halstead et al. |
| 6,938,048 B1 | 8/2005 | Jilk et al. |
| 7,069,242 B1 | 6/2006 | Sheth et al. |
| 7,096,193 B1 | 8/2006 | Beaudoin |
| 7,155,400 B1 | 12/2006 | Jilk et al. |
| 7,310,415 B1 | 12/2007 | Short .......................... 379/130 |
| 7,346,535 B2 | 3/2008 | Younger |
| 7,406,443 B1 | 7/2008 | Fink et al. ................... 705/37 |
| 7,437,327 B2 | 10/2008 | Lam et al. |
| 7,444,374 B1 | 10/2008 | Baker |
| 7,466,810 B1 | 12/2008 | Quon |
| 7,505,919 B2 | 3/2009 | Richardson |
| 7,587,336 B1 | 9/2009 | Wallgreen et al. .......... 705/26 |
| 7,752,080 B1* | 7/2010 | Greener ................. G06Q 10/10 705/26.1 |
| 7,778,938 B2 | 8/2010 | Stimac |
| 7,814,085 B1 | 10/2010 | Pfleger et al. |
| 7,966,265 B2 | 6/2011 | Schalk et al. |
| 8,024,225 B1 | 9/2011 | Sirota et al. |
| 8,024,670 B1 | 9/2011 | Rahmatian |
| 8,156,051 B1 | 4/2012 | Shah |
| 8,224,755 B2 | 7/2012 | Goodman et al. |
| 8,380,709 B1 | 2/2013 | Diller et al. |
| 8,504,403 B2 | 8/2013 | Deich |
| 8,512,143 B2* | 8/2013 | Jung ....................... G06N 3/006 380/200 |
| 8,517,742 B1 | 8/2013 | Johnson |
| 8,682,683 B2 | 3/2014 | Ananian |
| 8,700,694 B2 | 4/2014 | Archbold |
| 8,843,388 B1 | 9/2014 | Westfall |
| 8,856,670 B1 | 10/2014 | Thakur et al. |
| 9,020,271 B2 | 4/2015 | Deolalikar et al. |
| 9,454,576 B1 | 9/2016 | Kapoor |
| 2001/0011222 A1 | 8/2001 | McLauchlin et al. ............ 705/7 |
| 2001/0034630 A1 | 10/2001 | Mayer |
| 2001/0034688 A1* | 10/2001 | Annunziata .................. 705/37 |
| 2001/0041988 A1* | 11/2001 | Lin ........................ G06Q 30/02 705/1.1 |
| 2002/0007300 A1 | 1/2002 | Slatter |
| 2002/0010685 A1 | 1/2002 | Ashby |
| 2002/0023046 A1 | 2/2002 | Callahan et al. ............. 705/37 |
| 2002/0032576 A1 | 3/2002 | Abbott et al. |
| 2002/0052773 A1 | 5/2002 | Kraemer |
| 2002/0054138 A1 | 5/2002 | Hennum |
| 2002/0069031 A1 | 6/2002 | Lehman |
| 2002/0078432 A1 | 6/2002 | Charisius et al. |
| 2002/0103687 A1 | 8/2002 | Kipling |
| 2002/0120522 A1 | 8/2002 | Yang .............................. 705/26 |
| 2002/0120554 A1* | 8/2002 | Vega ....................... G06Q 20/10 705/37 |
| 2002/0129139 A1 | 9/2002 | Ramesh ...................... 709/224 |
| 2002/0133365 A1 | 9/2002 | Grey et al. ....................... 705/1 |
| 2002/0161707 A1* | 10/2002 | Cole ....................... G06Q 20/02 705/42 |
| 2002/0194077 A1 | 12/2002 | Dutta |
| 2002/0194112 A1 | 12/2002 | dePinto et al. |
| 2003/0004738 A1 | 1/2003 | Chander |
| 2003/0014294 A1 | 1/2003 | Yoneyama et al. |
| 2003/0046155 A1 | 3/2003 | Himmel et al. ............... 705/14 |
| 2003/0050811 A1 | 3/2003 | Freeman, Jr. |
| 2003/0055780 A1 | 3/2003 | Hansen et al. |
| 2003/0061266 A1 | 3/2003 | Ouchi |
| 2003/0086608 A1 | 5/2003 | Frost |
| 2003/0101126 A1 | 5/2003 | Cheung et al. |
| 2003/0120603 A1 | 6/2003 | Kojima et al. |
| 2003/0182171 A1 | 9/2003 | Vianello |
| 2003/0191684 A1 | 10/2003 | Lumsden et al. |
| 2003/0212246 A1 | 11/2003 | Eleveld |
| 2003/0220843 A1 | 11/2003 | Lam et al. |
| 2003/0233372 A1 | 12/2003 | Warner |
| 2004/0063463 A1 | 4/2004 | Boivin .......................... 455/558 |
| 2004/0103167 A1 | 5/2004 | Grooters et al. |
| 2004/0122926 A1 | 6/2004 | Moore et al. ................. 709/223 |
| 2004/0128224 A1* | 7/2004 | Dabney et al. ................. 705/37 |
| 2004/0215560 A1* | 10/2004 | Amalraj ................. G06Q 20/04 705/40 |
| 2004/0230466 A1 | 11/2004 | Davis et al. |
| 2004/0230511 A1* | 11/2004 | Kannan .................. G06Q 30/06 705/35 |
| 2004/0230521 A1 | 11/2004 | Broadbent et al. |
| 2004/0241627 A1 | 12/2004 | Delfing |
| 2004/0243428 A1 | 12/2004 | Black |
| 2005/0033633 A1 | 2/2005 | LaPasta |
| 2005/0043998 A1 | 2/2005 | Bross et al. |
| 2005/0097613 A1 | 5/2005 | Ulate et al. |
| 2005/0131830 A1 | 6/2005 | Juarez et al. |
| 2005/0177380 A1 | 8/2005 | Pritchard et al. |
| 2005/0222907 A1 | 10/2005 | Pupo |
| 2006/0031177 A1 | 2/2006 | Rule |
| 2006/0074708 A1 | 4/2006 | Woods |
| 2006/0080116 A1 | 4/2006 | Maguire |
| 2006/0106846 A1 | 5/2006 | Schulz |
| 2006/0122850 A1 | 6/2006 | Ward et al. |
| 2006/0136324 A1 | 6/2006 | Barry et al. |
| 2006/0143228 A1 | 6/2006 | Odio-Paez |
| 2006/0155609 A1 | 7/2006 | Caiafa |
| 2006/0177041 A1 | 8/2006 | Warner et al. |
| 2006/0195428 A1 | 8/2006 | Peckover |
| 2006/0212359 A1 | 9/2006 | Hudgeon |
| 2006/0284838 A1 | 12/2006 | Tsatalos |
| 2007/0005536 A1 | 1/2007 | Caswell et al. |
| 2007/0022040 A1 | 1/2007 | Gordon |
| 2007/0027746 A1 | 2/2007 | Grabowich |

(56) References Cited

U.S. PATENT DOCUMENTS

| | | |
|---|---|---|
| 2007/0027792 A1 | 2/2007 | Smith |
| 2007/0061144 A1 | 3/2007 | Grichnik et al. |
| 2007/0067196 A1 | 3/2007 | Usui |
| 2007/0078699 A1 | 4/2007 | Scott et al. .................... 705/10 |
| 2007/0088601 A1 | 4/2007 | Money et al. |
| 2007/0112671 A1* | 5/2007 | Rowan .................. G06Q 20/10 705/39 |
| 2007/0130059 A1* | 6/2007 | Lee ....................... G06Q 30/08 705/37 |
| 2007/0162379 A1 | 7/2007 | Skinner |
| 2007/0174180 A1 | 7/2007 | Shin |
| 2007/0174394 A1 | 7/2007 | Jayaweera |
| 2007/0185723 A1 | 8/2007 | Shellnutt |
| 2007/0192130 A1 | 8/2007 | Sandhu |
| 2007/0233510 A1* | 10/2007 | Howes ............... G06Q 30/0601 705/26.1 |
| 2008/0010598 A1 | 1/2008 | Smilowitz et al. |
| 2008/0046834 A1 | 2/2008 | Yu et al. |
| 2008/0059267 A1 | 3/2008 | Hamilton |
| 2008/0059523 A1 | 3/2008 | Schmidt et al. |
| 2008/0065444 A1 | 3/2008 | Stroman et al. |
| 2008/0082662 A1 | 4/2008 | Dandliker et al. |
| 2008/0091774 A1 | 4/2008 | Taylor et al. |
| 2008/0104495 A1 | 5/2008 | Craig |
| 2008/0109491 A1 | 5/2008 | Gupta |
| 2008/0134292 A1 | 6/2008 | Ariel et al. |
| 2008/0154783 A1 | 6/2008 | Rule et al. |
| 2008/0184135 A1 | 7/2008 | Washburn et al. |
| 2008/0194228 A1 | 8/2008 | Pousti et al. |
| 2008/0209417 A1 | 8/2008 | Jackobson |
| 2008/0244582 A1 | 10/2008 | Brown et al. |
| 2008/0288582 A1 | 11/2008 | Pousti et al. |
| 2008/0294505 A1 | 11/2008 | Markowitz et al. |
| 2008/0294631 A1 | 11/2008 | Malhas et al. |
| 2008/0294688 A1 | 11/2008 | Brousard |
| 2008/0313005 A1 | 12/2008 | Nessland et al. |
| 2009/0011395 A1 | 1/2009 | Schmidt et al. |
| 2009/0017788 A1 | 1/2009 | Doyle et al. .................... 455/406 |
| 2009/0055404 A1 | 2/2009 | Heiden et al. |
| 2009/0055476 A1 | 2/2009 | Marcus et al. |
| 2009/0112728 A1 | 4/2009 | Evers et al. |
| 2009/0116403 A1 | 5/2009 | Callanan et al. |
| 2009/0132345 A1 | 5/2009 | Meyssami et al. |
| 2009/0150386 A1 | 6/2009 | Lichtblau |
| 2009/0177691 A1 | 7/2009 | Manfredi et al. .......... 707/104.1 |
| 2009/0199185 A1 | 8/2009 | Slawson et al. |
| 2009/0210282 A1 | 8/2009 | Elenbaas et al. |
| 2009/0241035 A1 | 9/2009 | Tseng et al. |
| 2009/0241172 A1 | 9/2009 | Sennett et al. |
| 2009/0249340 A1 | 10/2009 | Akiyama et al. |
| 2009/0288021 A1 | 11/2009 | Ioffe et al. |
| 2009/0327081 A1 | 12/2009 | Wang et al. |
| 2010/0017253 A1 | 1/2010 | Butler et al. |
| 2010/0088749 A1 | 4/2010 | Steeples |
| 2010/0115040 A1 | 5/2010 | Sargent et al. |
| 2010/0144318 A1 | 6/2010 | Cable |
| 2010/0161503 A1 | 6/2010 | Foster |
| 2010/0162167 A1 | 6/2010 | Stallings et al. |
| 2010/0250322 A1 | 9/2010 | Norwood |
| 2010/0287525 A1 | 11/2010 | Wagner |
| 2010/0324948 A1 | 12/2010 | Kumar et al. |
| 2011/0106762 A1 | 5/2011 | Dane et al. |
| 2011/0107088 A1 | 5/2011 | Eng et al. |
| 2011/0131146 A1 | 6/2011 | Skutnik |
| 2011/0208665 A1 | 8/2011 | Hirsch |
| 2011/0238768 A1 | 9/2011 | Habets et al. |
| 2011/0302053 A1 | 12/2011 | Rigole |
| 2012/0041832 A1 | 2/2012 | Sheth et al. |
| 2012/0110087 A1 | 5/2012 | Culver et al. |
| 2012/0143952 A1 | 6/2012 | Von Graf |
| 2012/0150761 A1 | 6/2012 | Ananian |
| 2013/0246294 A1 | 9/2013 | Pendyala et al. |
| 2013/0325734 A1 | 12/2013 | Bixler et al. |
| 2014/0074738 A1 | 3/2014 | Thankappan et al. |
| 2014/0108078 A1 | 4/2014 | Davis |
| 2014/0164271 A1 | 6/2014 | Forman et al. |
| 2014/0222493 A1 | 8/2014 | Mohan et al. |
| 2014/0358646 A1 | 12/2014 | Said et al. |
| 2014/0377723 A1 | 12/2014 | Strong |
| 2015/0032654 A1 | 1/2015 | Huff |
| 2015/0134600 A1 | 5/2015 | Eisner et al. |
| 2016/0012135 A1 | 1/2016 | Wang et al. |

OTHER PUBLICATIONS ants.com web pages [online]. Ants.com [retrieved on Aug. 22, 2008]. Retrieved from the Internet: <URL: http://www.ants.com/ants/>.

bizbuyer.com web pages [online]. BizBuyer.com, Inc. [retrieved Aug. 18-21, 2000]. Retrieved from the Internet: <URL: http://www.bizbuyer.com/>.

BullhornPro web pages [online]. Bullhorn, Inc. [retrieved on Jan. 4, 2001]. Retrieved from the Internet: <URL: http://www.bullhornpro.com/>.

Cassidy, M., "Going for Broke," San Jose Mercury News, Monday, Aug. 16, 1999, pp. 1E and 4E, published in San Jose, CA.

Davenport, Thomas H. and Keri Pearlson, "Two Cheers for the Virtual Office," Summer 1998, abstract, retrieved from the Internet: <Url: http://www.pubservice.com/MSStore?ProductDetails.aspx?CPC=3944>.

efrenzy.com web pages [online]. eFrenzy, Inc. [retrieved on Aug. 22, 2000]. Retrieved from the Internet: <URL: http://www.efrenzy.com/index.isp>.

Eisenberg, D. "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.

eworkexchange.com web pages [online]. eWork Exchange, Inc. [retrieved on Aug. 18-22, 2000]. Retrieved from the Internet: <URL: http://www.eworks.com/>.

eWork Exchange web pages [online]. eWork Exchange, Inc. [retrieved on Jan. 5, 2001]. Retrieved from the Internet: <URL: http://www.eworks.com/>.

eWork ProSource web pages [online]. eWork Exchange, Inc. [retrieved on Jan. 3, 2001]. Retrieved from the Internet: <URL: http://www.ework.com/>.

FeeBid.com web pages [online]. FeeBid.com [retrieved on Dec. 18, 2000]. Retrieved from the Internet: <URL: http://www.feebid.com>.

freeagent.com web pages [online]. FreeAgent.com [retrieved Aug. 18-22, 2000]. Retrieved from the Internet: <URL: http://www.freeagent.com/>.

guru.com.com web pages [online]. Guru.com, Inc. [retrieved Aug. 18, 2000]. Retrieved from the Internet: <URL: http://www.guru.com/>.

Herhold, S., "Expert Advice is Collectible for Start-up," San Jose Mercury News, Monday, Aug. 16, 1999, pp. 1E and 6E, San Jose, CA.

hotdispatch.com web pages [online]. HotDispatch, Inc. [retrieved on Aug. 22, 2000]. Retrieved from the Internet: <URL: http://www.hotdispatch.com/>.

"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.

Humphreys, Paul et al., "A Just-in-Time Evaluation Strategy for International Procurement," MCB UP Limited, 1998, pp. 1-11.

imandi.com web pages [online]. Imandi Corporation [retrieved on Aug. 22, 2000]. Retrieved from the Internet: <URL: http://www.imandi.com/>.

Malone, Thomas W. et al., "The Dawn of the E-Lance Economy," Harvard Business Review, Sep.-Oct. 1998, pp. 145-152.

"Netscape Selects Netopia as the Exclusive 'Virtual Office' Offering on the New Netscape Small Business Source Service," PR Newswire, May 11, 1998, Mountain View and Alameda, California.

onvia.com web pages [online]. Onvia.com [retrieved Aug. 22, 2000]. Retrieved from the Internet: <URL: http://www.onvia.com/usa/home/index.cfm>.

(56) References Cited

OTHER PUBLICATIONS

Opus360 web pages [online]. Opus360 Corporation [retrieved on Jan. 3, 2001] Retrieved from the Internet: <URL: http://www.opus360com/>.

PCT International Search Report and Written Opinion, PCT/US06/22734, dated Jun. 3, 2008, 5 pages.

smarterwork.com web pges [online]. smarterwork.com, Inc. [retrieved on Aug. 22, 2000]. Retrieved from the Internet: <URL: http://www.smarterwork.com/>.

workexchange.com web pages [online]. WorkExchange, Inc. [retrieved Aug. 22, 2000]. Retrieved from the Internet: <URL: http://www.workexange.com/unique/workexchange/index1.cfm>.

Non-Final Office Action dated Jul. 18, 2011, U.S. Appl. No. 12/287,997, filed Oct. 14, 2008, Jonathan Paul Diller et al.

Shalil Majithia et al, "Reputation-based Semantic Service Discovery", Department of Computer Science, Cardiff University, UK, 13th IEEE International Workshops on Enabling Technologies: Infrastructure for Collaborative Enterprises (WET ICE '04) pp. 1-6.

Ziqiang Xu et al., "Reputation-Enhanced QoS-based Web Services Discovery", School of Computing, Queen's University, Jul. 2007, pp. 1-8.

Massimo Paolucci et al. "Semantic Matching of Web Services Capabilities" Carnegie Mellon University, 2002, Springer-Verlag Berlin Heidelberg, p. 333-347.

Office Action dated Aug. 28, 2012, U.S. Appl. No. 13/109,799, filed May 17, 2011, Jonathan Paul Diller et al.

Office Action dated May 8, 2013, U.S. Appl. No. 12/755,304, filed Apr. 6, 2010, Jonathan Paul Diller et al.

Final Office Action dated Mar. 13, 2013, U.S. Appl. No. 13/109,799, filed May 17, 2011, Jonathan P. Diller et al.

Office Action dated Jul. 30, 2013, U.S. Appl. No. 12/281,997, filed Oct. 14, 2008, Jonathan Paul Diller et al.

Office Action dated Nov. 25, 2013, U.S. Appl. No. 13/109,799, filed May 17, 2011, Jonathan Paul Diller et al.

Office Action dated Nov. 26, 2013, U.S. Appl. No. 12/287,997, filed Oct. 14, 2008, Jonathan Paul Diller et al.

Non-Final Office Action dated Nov. 10, 2014, U.S. Appl. No. 12/287,997, filed Oct. 14, 2008, Jonathan Paul Diller et al.

University of Wisconsin—Eau Claire LTS Online Help Documentation, Microsoft Excel 2003/2004, using the Sort Command, https://web.archive.org/web/20080311184836/http://www.uwec.edu/Help/Excel03/srtcom.htm,Mar. 11, 2008,retrieved Oct. 1, 2014.

Final Office Action dated Feb. 9, 2016, U.S. Appl. No. 13/109,799, filed May 17, 2011, Jonathan Paul Diller, 26 pages.

Office Action dated Apr. 30, 2015, U.S. Appl. No. 12/287,997, filed Oct. 14, 2008, Jonathan Paul Diller.

Muhl, Charles J. "What is an Employee—The Answer Depends on the Federal Law." Monthly Lab. Rev. 125(2002): 9 pages.

Barton, Lisa Horwedel "Reconciling the independent contractor versus employee dilemma: a discussion of current developments as they relate to employee benefit plans." Cap. UL Rev 29 (2001): 63 pages.

Moran, Jenna Amato "Independent Contractor or Employee-Misclassification of Workers and Its Effect of the State." Buff. Pub. Int. LJ 28 (2009): 28 pages.

Webb, Teresa J., et al. "An empirical assist in resolving the classification dilemma of workers as either employees or independent contractors." Journal of Applied Business Research (JABR) 24. (2011): 22 pages.

Wood, Robert W. "Defining Employees and Independent Contractors." Bus. L. Today 17 (2007): 6 pages.

\* cited by examiner

ONLINE ESCROW SERVICE

CROSS REFERENCE TO RELATED APPLICATIONS

This patent application is a divisional application which claims priority under 35 U.S.C. 121 of the co-pending U.S. patent application Ser. No. 12/287,997, filed Oct. 14, 2008, entitled "Online Escrow Service" which in turn claims priority under 35 U.S.C. 119(e) of the U.S. provisional application, Ser. No. 60/999,147, filed Oct. 15, 2007, and entitled "Online Escrow Service." This application incorporates both U.S. patent application Ser. No. 12/287,997, filed Oct. 14, 2008, entitled "Online Escrow Service, and U.S. provisional application, Ser. No. 60/999,147, filed Oct. 15, 2007, and entitled "Online Escrow Service," in their entirety by reference.

FIELD OF THE INVENTION

The present invention relates to escrows. More particularly, the present invention relates to an online escrow service.

BACKGROUND OF THE INVENTION

An escrow service is a licensed and regulated company that collects, holds, and releases an asset according to instructions agreed upon by two transacting parties, such as a purchaser and a seller. The escrow service reduces fraud by acting as a trusted third party for the purchaser and the seller. For example, the escrow service handles real property such as retail, commercial and residential, and high-ticketed personal property such as jewelry, automobiles and boats. When the purchaser receives and approves the real property or the personal property from the seller, the escrow service releases the asset to the seller. However, prior art escrow service suffer from a number of shortcomings. Work products of professional services, such as program source codes, literary writings, and artistic designs, are not handled by the prior art escrow service.

The present invention addresses at least these limitations in the prior art.

SUMMARY OF THE INVENTION

An object of the present invention is to provide an online escrow service for buyers and service providers in a services exchange medium. In the services exchange medium, buyers find and hire service providers "on demand" to get projects done quickly and cost effectively. Specifically, buyers post projects and service providers search for projects to work on. The online escrow service is used to secure assets for the projects in escrow until the projects are completed. The assets are then released to the service providers in exchange for services provided.

In one aspect, a method of using an escrow service on a computing device comprises selecting an escrow payment option for a task within a services exchange medium. Typically, the selecting occurs during a posting of the task by a buyer, a bidding of the task by a service provider, or after a completion of the task by the service provider. The task is a milestone for a project. The method also comprises depositing an asset into escrow by the buyer. Typically, the depositing results in a charge to an account belonging to the buyer. The method also comprises releasing the asset from escrow upon a predetermined event. Typically, the predetermined event is the buyer approving a completion of the task, and the asset is released to the service provider. In some embodiments, the method further includes filing a U.S. federal tax form. In other embodiments, the method also comprises utilizing a dispute assistance feature to settle a dispute arising from the task. The dispute assistance feature is self-resolution, dispute support offered by the services exchange medium, or arbitration offered by a third party.

In another aspect, a method of using on a computing device an escrow service within a services exchange medium comprising auto-requesting funding for a task. Typically, the task is a milestone for a project. In some embodiments, the method further comprises accepting the auto-request and depositing an asset into escrow by a buyer. The method also comprises completing the task by a service provider and receiving a notification by the buyer. Typically, the notification is a request-funding message or a release-asset message. In other embodiments, the method further comprises depositing the asset in escrow after receiving the request-funding message. The method also comprises releasing the asset from escrow upon a predetermined event. Typically, the releasing occurs upon the buyer approving a completion of the task, and the asset is released to the service provider. Yet, in other embodiments, the method also comprises filing a U.S. federal tax form and utilizing a dispute assistance feature to settle a dispute arising from the task. The dispute assistance feature is self-resolution, dispute support offered by the services exchange medium, or arbitration offered by a third party.

Yet, in another aspect, a system within a services exchange medium comprises at least one buyer posting a project having at least one task. Typically, the at least one task is a project milestone. The system also comprises at least one service provider obtaining the project, and an escrow service configured to hold an asset for the at least one task in escrow and to release the asset upon an event. Typically, the escrow service is requested during the project posting by the at least one buyer, during a bidding of the project by the at least one service provider, or after a completion of the at least one task by the at least one service provider. Typically, the event is the buyer approving completion of the at least one task. In some embodiments, the escrow service includes a tax filing feature and a dispute assistance feature. Typically, the dispute assistance feature is configured to settle a dispute arising from the at least one task. The dispute assistance feature is self-resolution, dispute support offered by the services exchange medium, or arbitration offered by a third party.

DETAILED DESCRIPTION OF THE INVENTION

Figure 1:
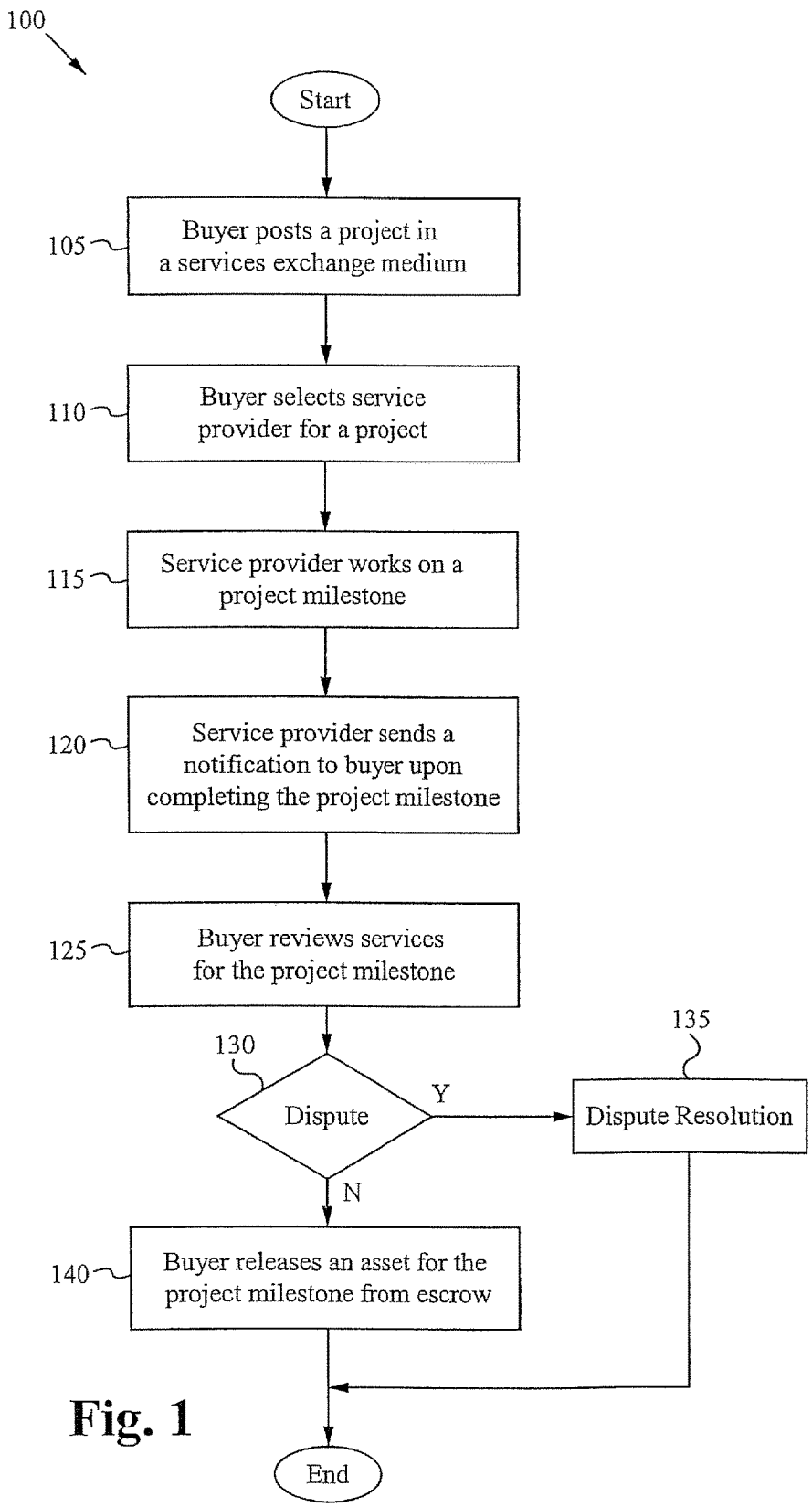
FIG. 1 illustrates an exemplary method of using an online escrow service in accordance with the present invention.

In the following description, numerous details are set forth for purposes of explanation. However, one of ordinary skill in the art will realize that the invention may be practiced without the use of these specific details or with equivalent alternatives. Thus, the present invention is not intended to be limited to the embodiments shown but is to be accorded the widest scope consistent with the principles and features described herein.

Reference will now be made in detail to implementations of the present invention as illustrated in the accompanying drawings. The same reference indicators will be used throughout the drawings and the following detailed description to refer to the same or like parts.

An escrow is an arrangement in which an asset is delivered to a third party or escrow agent to be held in trust pending a fulfillment of an agreed-upon condition. Typically, the asset is money. Alternatively, the asset is other property. Upon the fulfillment of the agreed-upon condition, the asset is delivered to a recipient.

Embodiments of the present invention are directed to providing an online escrow service for buyers and service providers within a services exchange medium. Typically, a buyer is an individual or a firm. Likewise, a service provider is an individual or a firm. Preferably, in the services exchange medium, buyers find and hire service providers "on demand" to get projects done quickly and cost effectively. Specifically, buyers post projects and service providers search for projects to work on. The service providers are also able to bid on projects posted by buyers in the services exchange medium. In the services exchange medium, the service provider creates a profile in order to be immediately connected to buyers looking for the service provider's expertise. As such, the services exchange medium is for hiring and working on demand. In some embodiments, buyers are able to view the service provider's profile on a web browser of a computing device. Preferably, the computing device is an Internet-ready device. The computing device is a personal computer, laptop computer, computer workstation, a server, mainframe computer, handheld computer, personal digital assistant, cellular/mobile telephone, smart appliance, gaming console or any other computing device.

The services exchange medium includes online resources configured to facilitate completion by a service provider of a project for a buyer. In some embodiments, the online resources include a private message board to maintain a written record of communication between the buyer and the service provider. The written record can include internal message board posts that originate from inside of the services exchange medium and external email exchanges that originate from outside of the services exchange medium. The communication can include establishment of a plurality of tasks for the job. A finished work product associated with each of the plurality of tasks is transmitted to the buyer via the private message board.

The online resources also include the online escrow service. The online escrow service is used to secure assets for the projects in escrow until the projects are completed. The assets are then released to the service providers in exchange for services provided. As such, the online escrow service advantageously protects both the buyer and the service provider. In some embodiments, the online escrow service is offered at little or no cost to the buyer, the service provider, or both.

In some embodiments, the buyer, the service provider, or both are able to ascribe escrow status to a project or service before engaging. FIG. 1 illustrates a process 100 of using the online escrow service. At step 105, the buyer is able to ascribe the escrow status to the project upon posting the project within the services exchange medium. Specifically, when the buyer posts the project, the buyer is able to choose between a standard payment option and an escrow payment option. Typically, the standard payment option is suitable for smaller projects having a single project milestone or task, while the escrow payment option is suitable for larger projects with multiple project milestones. In other embodiments, the escrow payment option is also suitable for the smaller projects. The project is designated as a standard payment project when the buyer chooses the standard payment option upon posting. As such, the buyer is able to make a direct payment to the service provider. Alternatively, the project is designated as an escrow project when the buyer chooses the escrow payment option upon posting. In the services exchange medium, escrow projects are easily identified with a unique symbol, word, highlighting, or the like. Thus, the services providers are able to easily recognize the escrow projects before bidding within the services exchange medium.

In some embodiments, if the buyer has not chosen an option for the project, the standard payment option is chosen by default. In other embodiments, the selected option for the project is able to be changed to another after the posting of the project.

In some embodiments, if a project has multiple project milestones, the buyer is able to use the escrow service for a portion of the project milestones and not for another portion of the project milestones. The project as a whole, in some embodiments, is still designated as an escrow project within the services exchange medium.

Figure 5:
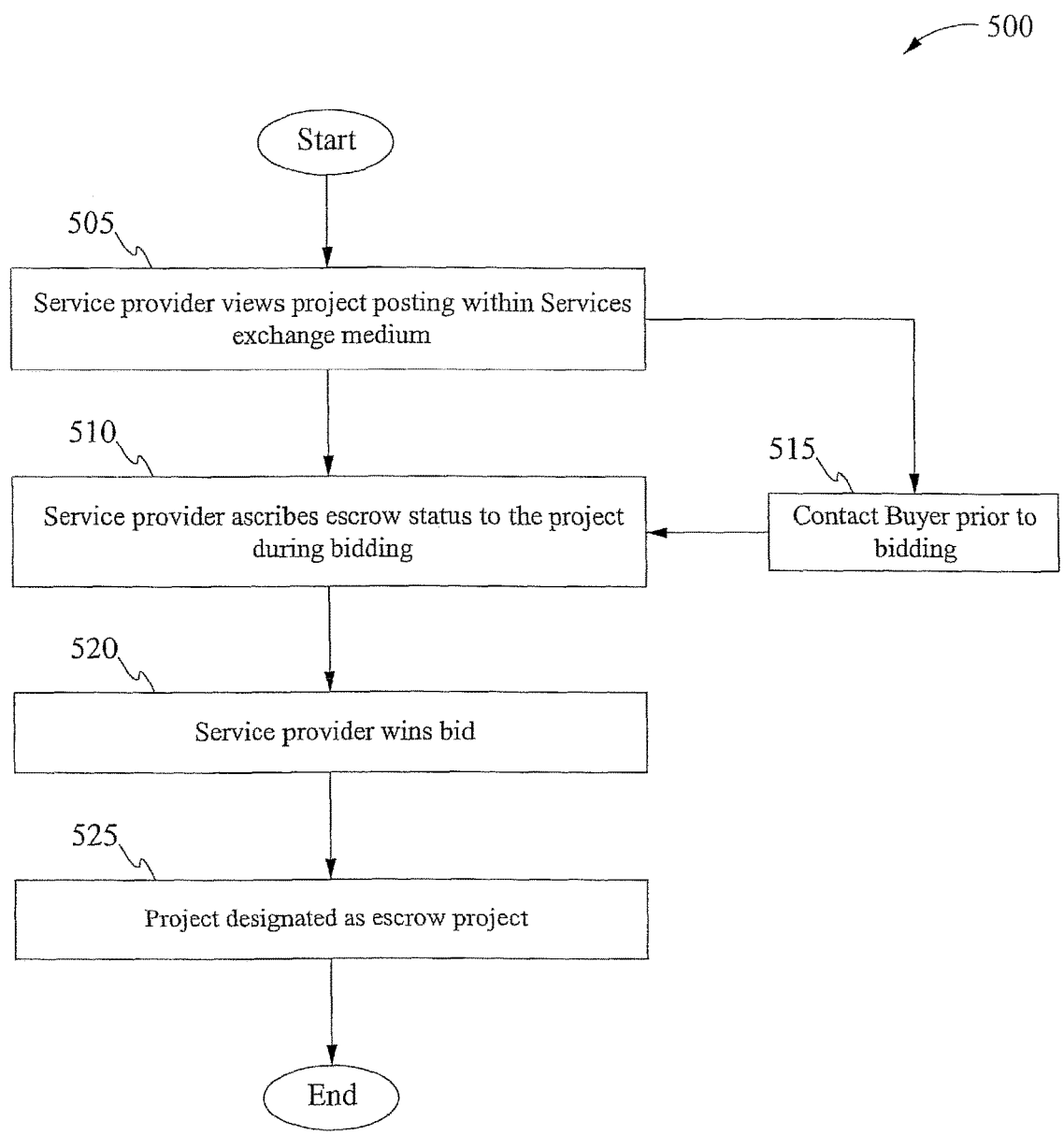
FIG. 5 illustrates an exemplary method of ascribing escrow status to a project in accordance with the present invention.

As mentioned above, the service provider is also able to ascribe escrow status to a posted project that is designated as a standard payment project. FIG. 5 illustrates a process 500 of the service provider ascribing the escrow status to the posted project. At step 505, the service provider views the posted project within the services exchange medium. At step 510, the service provider is able to ascribe escrow status to the posted project while bidding on the project within the services exchange medium even if the buyer had not done so upon posting. In some embodiments, the service provider is able to specifically ascribe escrow status to one or more project milestones. In other embodiments, the service provider is able to contact the buyer prior to bidding to ensure that using the online escrow service for the posted project is acceptable to the buyer at step 515. If the service provider ascribes the escrow status to the posted project and wins the bid at step 520, then the posted project is designated as an escrow project at step 525.

After the buyer chooses the service provider for the project at step 110 of FIG. 1, specifics of the project are able to be further negotiated and set by the buyer, the service provider, or both. In some embodiments, existing project milestones are able to be modified or deleted, and new project milestones are able to be added. Also, during negotiation, individual project milestones can be designated to use the standard payment option or the escrow payment option.

Figure 2:
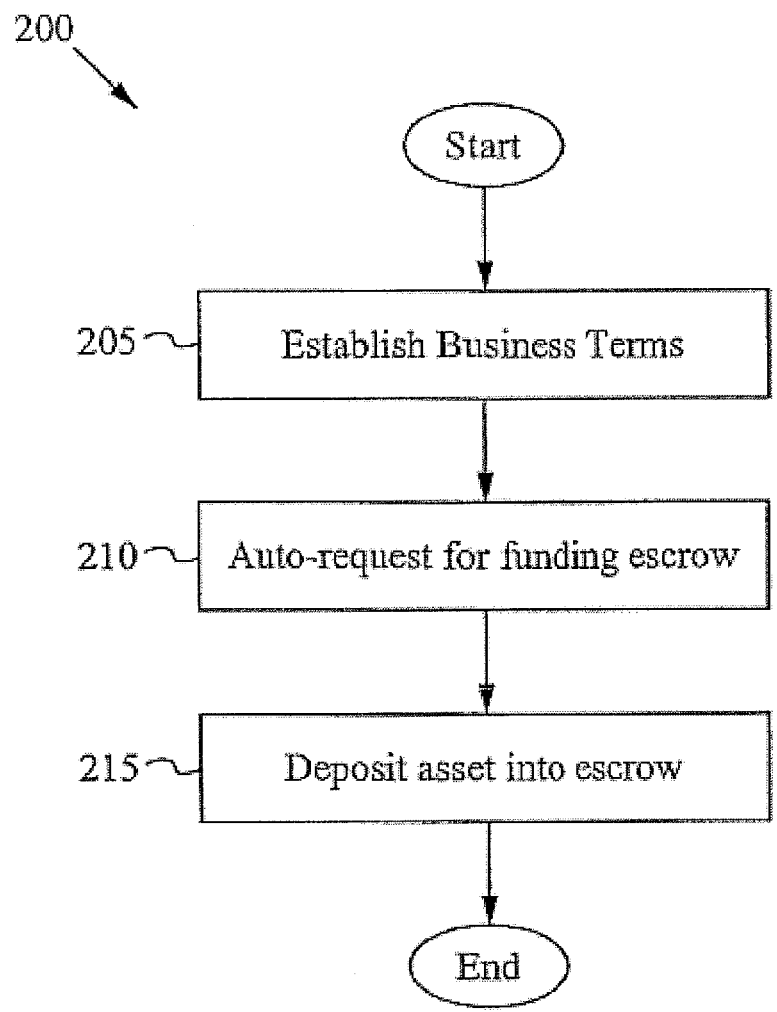
FIG. 2 illustrates an exemplary method of depositing asset into escrow in accordance with the present invention.
Figure 4:
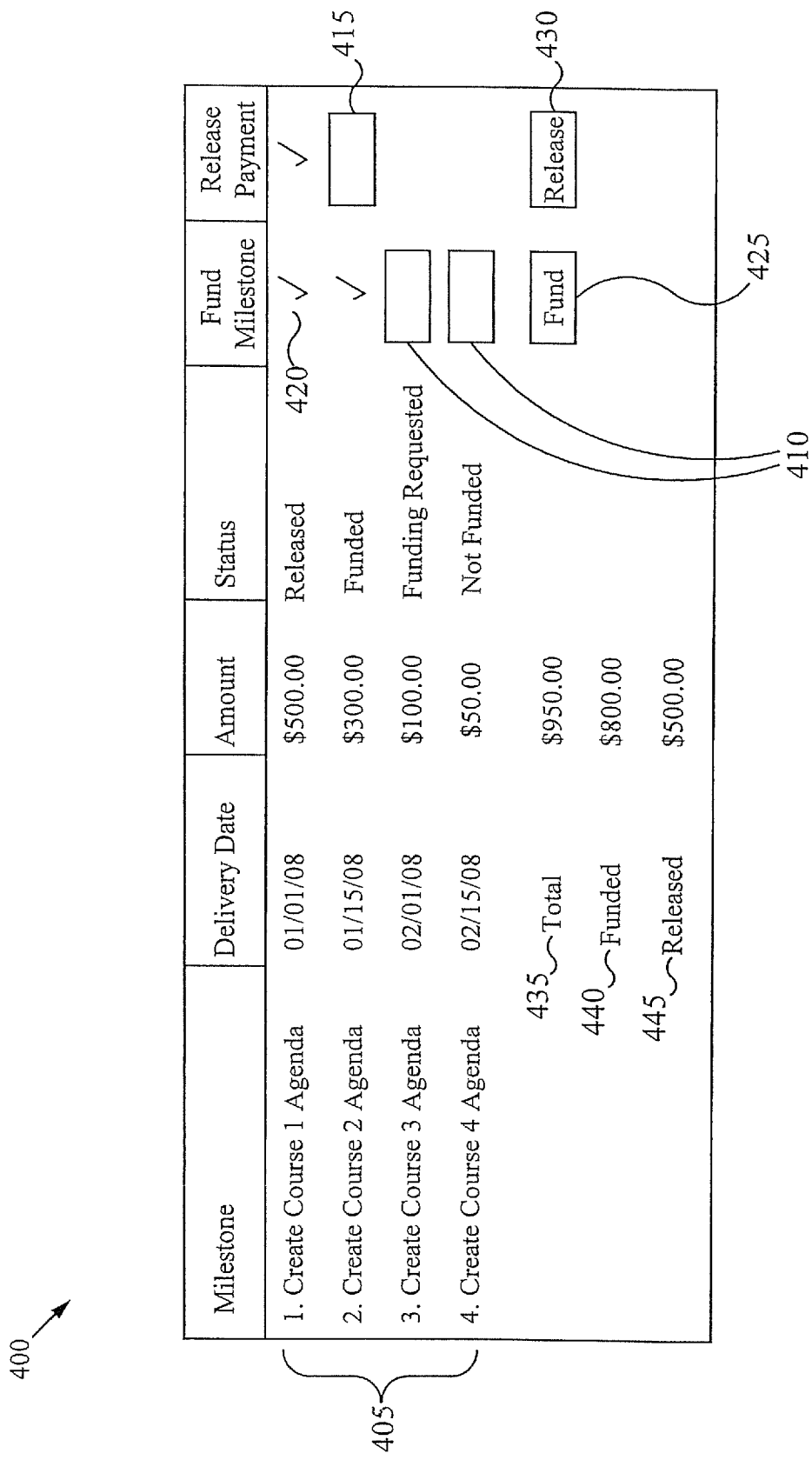
FIG. 4 illustrates an exemplary table of project milestones in accordance with the present invention.

FIG. 2 illustrates a process 200 of depositing asset into escrow in accordance with the present invention. At step 205, the specifics of the project, known as Business Terms, are established. In some embodiments, Business Terms include project milestones. A delivery date and an agreed-upon amount are associated with each project milestone. For example, assume that the project has four project milestones, as illustrated in FIG. 4. A first project milestone, labeled as "Create Course 1 Agenda," has a delivery date of Jan. 1, 2008 and an agreed-upon amount of $500. A second project milestone, labeled as "Create Course 2 Agenda," has a delivery date of Jan. 15, 2008 and an agreed-upon amount of $300. A third project milestone, labeled as "Create Course 3 Agenda," has a delivery date of Feb. 1, 2008 and an agreed-upon amount of $100. A fourth project milestone, labeled as "Create Course 4 Agenda," has a delivery date of Feb. 15, 2008 and an agreed-upon amount of $50.

Typically, the service provider submits the Business Terms to the buyer, and the buyer then reviews, negotiates, modifies, and/or approves the Business Terms before the project is fully awarded to the service provider. In some embodiments, the buyer, the service provider, or both, are able to modify the Business Terms. When one or more terms of a funded project milestone are modified (e.g. details, delivery date, payment schedule, funded amount), the services exchange medium typically issues a full refund back to the buyer's original payment source (e.g. credit card) if the asset has not yet been released to the service provider and the modified Business Terms are accepted by both the buyer and the service provider. The buyer needs to fund the modified milestone once again. In other embodiments, the buyer, the service provider, or both are also able to add additional project milestones as needed within the services exchange medium if and when the project expands in scope. Similarly, a delivery date and an agreed-upon amount need to be established for each of the additional project milestones. A newly added project milestones can be designated to use the standard payment option or the escrow payment option.

After the Business Terms are established and the project is fully awarded to the service provider, at step 210, an auto-request for funding in some embodiments is generated for the first project milestone having designated to use the escrow payment option. In other embodiments, an auto-request for funding is generated for each project milestone having designated to use the escrow payment option. The buyer is able to fund none, a portion, or all of the project milestones before the service provider begins work on one of the project milestones. For purposes of illustration, assume that each project milestone of the project is designated to use the escrow payment option. At step 215, the buyer deposits the asset into escrow. Preferably, the amount of asset deposited into escrow is equal to the total amount agreed-upon for those project milestones selected to be funded.

In some embodiments, the buyer is not able to deposit a partial amount into escrow for a project milestone. Instead, the buyer deposits either no amount or a full amount into escrow for the project milestone. If the buyer does not want to deposit the full amount into escrow for the project milestone, then the buyer is able to request that the service provider agree to modify the Business Terms to include additional project milestones with smaller payments, as discussed above. In other embodiments, the buyer is able to deposit the partial amount into escrow for the project milestone. Typically, the depositing of the asset into escrow results in a charge to a credit card, a bank account, a PayPal account, or another account belonging to the buyer. Yet, in other embodiments, before the buyer authorizes the deposit or funding, the buyer is required to read and agree to a billing and payment service policy of the services exchange medium.

Returning to FIG. 1, the service provider begins work on one of the project milestones at step 115. In some embodiments, the service provider is not obligated to begin work on a project milestone until that project milestone or at least one project milestone has been fully funded (e.g. asset is deposited into escrow) at step 215 of FIG. 2. In other embodiments, the service provider must start work immediately after the project is awarded to the service provider, regardless whether any asset has been deposited into escrow. The service provider typically works on the project milestones in the order of delivery date. Alternatively, the service provider works on the project milestones in the order of difficulty or in any other preferred order. Typically, the service provider completes each of the project milestones prior or by each of the project milestones' delivery date. In some embodiments, when the service provider is working on the project milestone, the service provider is able to generate status reports that allow the buyer to view the progress of that project milestone. Status reports are typically periodically sent to the buyer, as determined by both parties or by the services exchange medium, until the project milestone is completed. The buyer in some embodiments is able to ask the service provider to generate status reports and/or request for a status report in a interim. In other embodiments, all generated status reports are ultimately appended to an invoice sent to the buyer.

Figure 3:
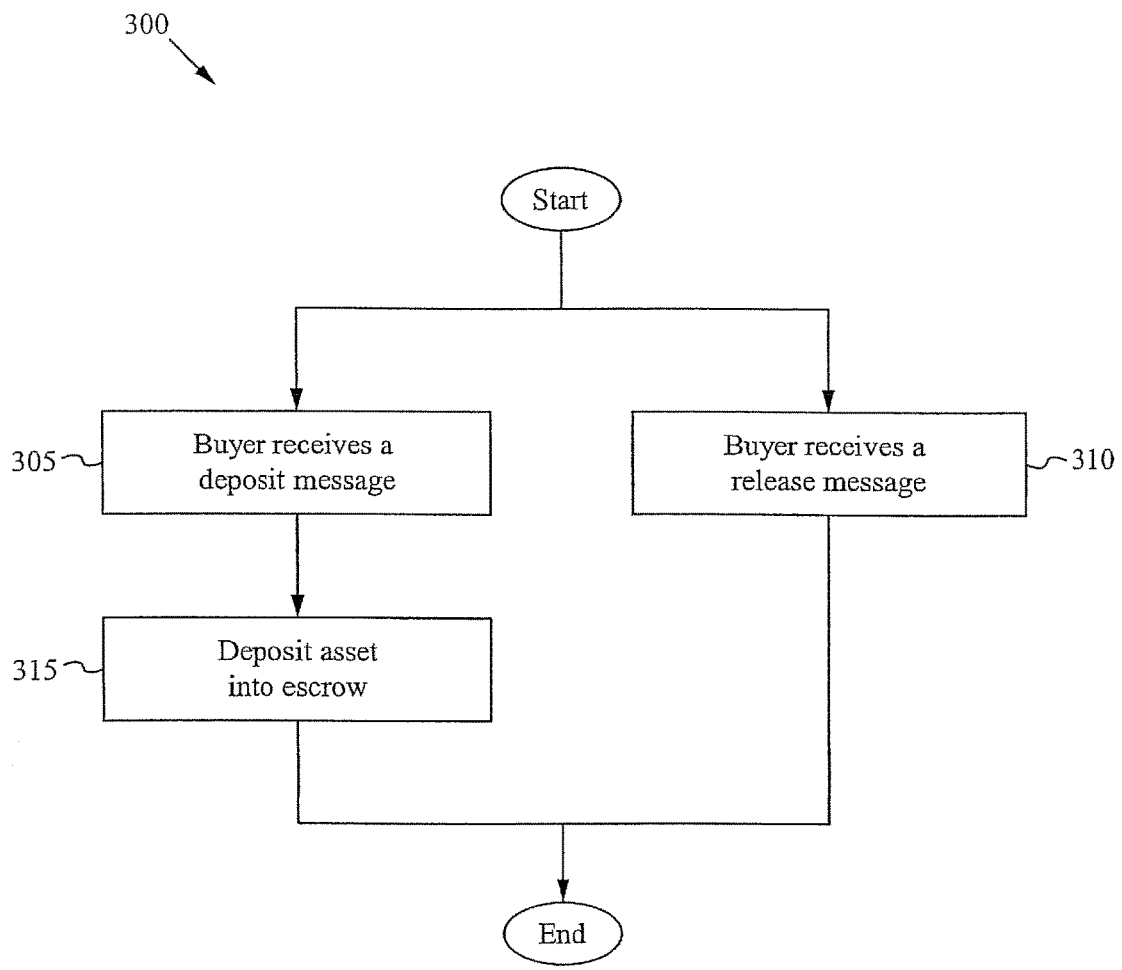
FIG. 3 illustrates another exemplary method of depositing asset into escrow in accordance with the present invention.

After the service provider completes the project milestone, a notification is sent to the buyer at step 120. FIG. 3 illustrates another process 300 of depositing asset into escrow in accordance with the present invention. If the buyer had not deposited the asset for the project milestone into escrow before the service provider completed the project milestone, then the buyer receives a notification requesting that the asset for the project milestone be deposited into escrow at step 305. As discussed above, the buyer is not required to fund the project milestone that the service provider has worked on; instead, the buyer, in some embodiments, is able to fund a different project milestone other than the one the service provider has worked on. Alternatively, if the buyer had deposited the asset for the project milestone into escrow before the service provider completed that project milestone, then the buyer receives a notification requesting that the asset for the project milestone be released at step 310. The notification is in the form of a system generated message alert, an email, an instant message, or a call. Other notifications are possible.

If the notification is a request for the asset for the project milestone to be deposited, then the buyer funds the completed project milestone by depositing the asset into escrow at step 315. Preferably, the asset for the project milestone is equal to the agreed-upon amount. As mentioned above, the depositing of the asset into escrow results in a charge to the credit card, the bank account, the PayPal account, or the another account belonging to the buyer.

Returning to FIG. 1, in addition to sending a notification to the buyer, the service provider is also able to create and send an invoice for the project milestone completed at step 120. The invoice typically includes an amount due for the project milestone completed. All generated status reports previously sent to the buyer are appended to the invoice. After receiving the notification and/or the invoice and status reports, the buyer is able to review services completed related to the project milestone (deliverables) at step 125. If there are no disputes regarding the deliverables at step 130, then the buyer releases the asset from escrow to the service provider after accepting/approving the deliverables at step 140. When the buyer releases the asset from escrow, the buyer is agreeing that all the services related to the project milestone have been completed to the buyer's satisfaction. In some embodiments, after the service provider accepts/approves the deliverables, the buyer receives a notification indicating the buyer's acceptance/approval (not illustrated).

Typically, the asset is released from escrow into an account belonging to the service provider within the services exchange medium. Alternatively, the asset is released from escrow as specified by the service provider.

In some embodiments, the buyer is not able to release a partial amount from escrow for the project milestone. Instead, the buyer must release a full amount from escrow for the project milestone. If the buyer does not intend to release the full amount from escrow for the project milestone, the buyer is able to request that the service provider agree to modify the Business Terms with additional project milestones with smaller payments, as discussed above. The buyer is able to make such a request prior, during, or after completion of the project milestone. As such, the buyer is able to release the partial amount to the service provider. In other embodiments, the buyer is able to release the partial amount from escrow for the project milestone.

If a dispute arises regarding the services related to the project milestone at step 130, then the buyer does not release the asset from escrow to the service provider. Instead, dispute assistance takes place at step 135. Preferably, the asset is held in escrow until the dispute is settled. The dispute assistance feature is discussed in detail below.

In some embodiments, the buyer is able to pre-fund one or more project milestones before the service provider begins work on one of the project milestones. Pre-funding a project milestone provides the service provider working on the funded project milestone with a sense of security of knowing that asset is already held in escrow and that the service provider will be paid for the services provided unless a dispute arises. Alternatively, the buyer is able to post-fund a particular project milestone after the service provider completes the particular project milestone. Accordingly, the buyer is able to fund any project milestone at any time.

In other embodiments, the buyer is also able to view information regarding each project milestone at any time within the services exchange medium. FIG. 4 illustrates the four project milestones 405 entitled "Create Course 1 Agenda," "Create Course 2 Agenda," "Create Course 3 Agenda," and "Create Course 4 Agenda" listed in a table 400. In addition to displaying the delivery date and the agreed-upon amount for each project milestone, a current status for each project milestone is displayed in the table 400. In some embodiments, the current status of a project milestone is released, funded, funding requested, or not funded. If the buyer has not done so for a project milestone, the buyer is able to fund a project milestone or release a payment (e.g. asset) from escrow by checking a fund milestone checkbox 410 and a release payment checkbox 415, respectively. Project milestones that are funded or with released payments are designated with a checkmark 420.

For example, since the first project milestone is funded and an associated asset has been released from escrow, the first project milestone has two corresponding checkmarks 420, as illustrated in FIG. 4. Since the second milestone has been funded but an associated asset has not been released from escrow, the buyer is able to release the associated asset by checking a corresponding release payment checkbox 415 and clicking on a release button 430. Since the third project milestone has a funding request status, the buyer is able to fund the third project milestone by checking a corresponding fund milestone checkbox 410 and clicking on a fund button 425. A corresponding release payment checkbox does not exist because the third project milestone has not yet been funded. Similarly, since the fourth project milestone has a not funded status, a corresponding release payment checkbox also does not exist. However, a corresponding fund milestone checkbox 410 exists because the buyer is able to pre-fund the fourth project milestone before the service provider requests funding. As mentioned above, the buyer is able to fund one or more project milestones at any time. As such, since the buyer is able to fund one or more project milestones at any time, the buyer is able to check on the fund milestone checkboxes 410 for the third project milestone and the fourth project milestone before clicking on the fund button 425.

In some embodiments, a sum of the agreed-upon amount for each project milestone 435, a sum of all funded project milestones 440, and a sum of assets released from escrow 445 are displayed in the table 400. Other information displayed in the table 400 is possible. It should be understood that the table 400 is exemplary only and does not serve to limit what and how the information regarding the project milestones is displayed.

Similarly, the service provider is able to view information regarding each project milestone at any time within the services exchange medium. For example, each project milestone is displayed in a table with a delivery date, an agreed-upon amount, a released amount, and a current status. In some embodiments, the table contains other relevant information.

As discussed above, the online escrow service is tied to a completion of a project milestone of a larger project. Alternatively, the online escrow service is tied to a completion of a smaller project having only a single project milestone. Alternatively, the online escrow service is tied to a completion of an Elance-like service.

In some embodiments, the online escrow service has two additional features accessible to buyers within the services exchange medium: a 1099 feature and a dispute assistance feature. Typically, the 1099 feature is only available for U.S. buyers working with U.S. service providers since the U.S. buyers are required to submit 1099 U.S. federal tax forms to the U.S. Internal Revenue Service (I.R.S.) after an end of a tax year. The I.R.S. imposes penalties on an employer (e.g. an U.S. buyer within the services exchange medium) who has paid an independent contractor (e.g., an U.S. service provider within the services exchange medium) more than $600 for services within one calendar year and has not issued a 1099 U.S. federal tax form. It is the employer's responsibility to issue the 1099 U.S. federal tax form to the I.R.S., not the contractor's. Employers are also subject to a penalty of up to $50 per information return that is filed without the necessary information. As such, for many buyers with multiple projects and service providers, taxes involve a great deal of paperwork.

Within the services exchange medium, the 1099 feature allows the U.S. buyers to file 1099 U.S. federal tax forms at little or no cost to the U.S. buyers. In some embodiments, the U.S. buyers are able to select an option for the services exchange medium to file on the U.S. buyer's behalf. As such, for projects that have been marked for 1099 service, the services exchange medium issues the 1099 U.S. federal tax forms on behalf of the U.S. buyers to the I.R.S. and to the U.S. service providers after the end of the tax year. In other embodiments, a summary report is also provided for the U.S. buyers.

Typically, dispute assistance takes place when a dispute arises at step 130 of FIG. 1. As mentioned above, an asset of a project milestone is typically released from escrow to the service provider upon the buyer's acceptance/approval of the services related to the project milestone. However, if a dispute arises regarding the services related to the project milestone, then the asset is not released to the service provider and is held in escrow until the dispute is settled or resolved. Both the service provider and the buyer are able to request dispute assistance at step 135 when a dispute arises.

In some embodiments, the dispute assistance feature has three levels of resolving disputes. In a first level, when a dispute arises between the buyer and the service provider, the buyer and the service provider are able to try to resolve the dispute through self-resolution. Preferably, the buyer and the service provider follow a set of rules regarding self-resolution. The set of rules is typically implemented within the services exchange medium. The asset held in escrow is released in part or in full to the service provider after the dispute is settled. Alternatively, the asset held in escrow is returned in part or in full to the buyer after the dispute is settled. In an event that the self-resolution fails to resolve the dispute with a predetermined number of days, the buyer, the service provider, or both are able to utilize dispute support offered by the services exchange medium. In some embodiments, the number of days before the dispute support is utilized is 15. Longer or shorter number of days before the dispute support is utilized is possible.

The dispute support is a second level of dispute assistance. The dispute support is typically utilized when self-resolution fails. Alternatively, dispute support is able to be utilized when either the buyer or the service provider makes a request upon the dispute arising, thereby bypassing the first level of the dispute assistance feature (e.g. self-resolution). In some embodiments, using the dispute support is free and/or is offered at a cost to the buyer, the service provider, or both. The dispute support in some embodiments is a service provided by the services exchange medium.

A third level of dispute assistance is mandatory arbitration by a third party if the dispute support fails to produce an agreement between the parties. Alternatively, the third party arbitrator is able to be utilized when either the buyer or the service provider makes such a request upon the dispute arising, thereby bypassing the first and second levels of the dispute assistance feature (e.g. self-resolution and the dispute support). Typically, decisions made by the third party arbitrator are binding. In the event that the dispute support and the third party arbitration are both requested, the dispute support is first utilized; if the dispute support fails to produce an agreement between the parties, then the third party arbitrator is used. Alternatively, the third party arbitration is utilized. In some embodiments, using the third party arbitrator is free and/or is offered at a cost to the buyer, the service provider, or both.

In some embodiments, when resolving the dispute using the second or the third level of dispute assistance, the entity (e.g. the services exchange medium or the third party arbitrator) reviews the Business Terms and all documents submitted within the services exchange medium for the project. The entity calls the buyer and the service provider to arrange a mediation conference call. Preferably, the goal of the conference call is to resolve the dispute and deliver joint written instructions to the services exchange medium concerning the release of the asset. Typically, the entity does not make a determination of or assess blame. Preferably, the entity acts to facilitate discussion between the service provider and the buyer to foster a resolution of the dispute.

In some embodiments, if the project milestone has not yet been funded by the buyer, or the asset has already been released to the service provider, then the first and the second levels of the dispute assistance feature cannot be utilized, as the asset does not exist or no longer exists in escrow. In other embodiments, the first and/or the second levels of the dispute assistance feature are only available if the project is an escrow project, a contract between the service provider and the buyer exists within the services exchange medium, and the asset is still held in escrow. In some embodiments, the contract includes Business Terms.

The online escrow service advantageously protects both the buyer and the service provider. The online escrow service in some embodiments is tied to delivery of a service, specifically, a completion of a project milestone. In some embodiments, one or more status reports generated during the completion of the project milestone are also delivered as part of the service to the buyer. Typically, after the buyer reviews the deliverables completed by the service provider, and to the satisfaction of the buyer, the fund in escrow (for the project milestone) is released to the service provider. The online escrow service is a self-service utility that enables the service provider to request a fund, and the buyer to provide and release funds electronically.

The online escrow service in some embodiments is able to support fixed-price services, hourly contracted services, or both. The online escrow service is able to support services exchanged via the services exchange medium. Alternatively or in addition, the online escrow service is able to support remote work performed on a contract basis.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the online escrow service will occur. Consequently, the claims should be broadly construed, consistent with the spirit and scope of the invention, and should not be limited to their exact, literal meaning.

We claim:

1. A non-transitory computer-readable medium storing instructions that, when executed by a computing device, cause the computing device to perform a method of optimizing performance in a services exchange medium, the method comprising:

receiving from a first end user device a request to create a job post of a project that a buyer needs completed;

receiving from a second end user device a request to create an online profile of a service provider;

publishing the job post of the project that the buyer needs completed and the online profile of the service provider within the services exchange medium such that the job post and the online are searchable by viewers; and providing a networked platform communicatively coupling the first end user device and the second end user device, wherein the networked platform includes online resources configured to facilitate completion of the project by the service provider, wherein the online resources include an online escrow service and a private message board, wherein the private message board maintains a written record of communication between the buyer and the service provider, wherein the communication includes internal message board posts that originate from inside of the services exchange medium and external email exchanges that originate from outside of the services exchange medium to improve overall throughput of the computing device by reducing the total number of simultaneous client connections with the computing device necessary for the maintenance of the written record, wherein the communication includes establishment of a plurality of tasks for the job, wherein a finished work product associated with each of the plurality of tasks is transmitted to the buyer via the private message board;

presenting an user interface allowing a user to choose between a standard payment option and an escrow payment option for each of the plurality of tasks associated with the project, wherein the project is visibly distinguished as an escrow project from non-escrowed projects in the online services exchange medium upon the user choosing the escrow payment option for at least one of the plurality of tasks associated with the project;

automatically generating and transmitting to the buyer a request for funding of a task designated by the user as using the escrow payment option;

interfacing with the online escrow service configured to secure an asset for the task designated by the user as using the escrow payment option;

periodically transmitting a status report to the buyer until the task is completed;

automatically generating and transmitting to the buyer a notification of the service provider completing the task;

transmitting an invoice for the task, wherein all transmitted status reports are appended with the invoice;

releasing the asset from escrow upon a predetermined event; and transmitting a finished work product associated with the task via the private message board.

2. The non-transitory computer-readable medium of claim 1, wherein the task is a milestone for the project.

3. The non-transitory computer-readable medium of claim 1, further comprising receiving the asset from the buyer after automatically generating and transmitting the buyer a request for funding of a task.

4. The non-transitory computer-readable medium of claim 3, further comprising depositing the asset into escrow after receiving the asset from the buyer.

5. The non-transitory computer-readable medium of claim 1, wherein the predetermined event is the buyer approving completion of the task, and wherein the asset is released to the service provider.

6. The non-transitory computer-readable medium of claim 1, further comprising filing a U.S. federal tax form in response to releasing the asset from escrow.

7. The non-transitory computer-readable medium of claim 1, further comprising utilizing a dispute assistance feature to settle a dispute arising from the task.

8. The non-transitory computer-readable medium of claim 7, wherein the dispute assistance feature is at least one of self-resolution, dispute support offered by the services exchange medium, and arbitration offered by a third party.

9. The non-transitory computer-readable medium of claim 1, wherein automatically generating and transmitting to the buyer a request for funding of a task is in response to the buyer posting the task to the online services exchange medium and selecting the escrow payment option.

10. The non-transitory computer-readable medium of claim 1, wherein automatically generating and transmitting to the buyer a request for funding of a task is in response to the service provider indicating on the online services exchange medium that the service provider has completed the task.

11. The non-transitory computer-readable medium of claim 1, wherein the predetermined event is the buyer approving the completion of the task, and wherein the asset is released to a third party.

12. The non-transitory computer-readable medium of claim 5, wherein the escrow has been funded, and wherein the notification further comprises a release-asset message.

13. The non-transitory computer-readable medium of claim 1, wherein automatically generating and transmitting to the buyer a request for funding of a task is in response to the service provider ascribes the escrow payment option while bidding on the task.

14. The non-transitory computer-readable medium of claim 1, further comprising ascribing the project escrow status, wherein the escrow payment option is selected for at least one of the plurality of tasks.

15. The non-transitory computer-readable medium of claim 1, wherein the notification is an instant message.

16. The non-transitory computer-readable medium of claim 1, wherein the notification is a phone call.

17. The non-transitory computer-readable medium of claim 1, further comprising, prior to receiving funding for the task, presenting a service policy of the services exchange medium to the buyer, wherein the buyer is required to read and agree to the policy.

18. The non-transitory computer-readable medium of claim 1, wherein the transmitted status reports include at least one report generated upon a request from the buyer.

19. A method of optimizing performance in a services exchange medium, comprising:

maintaining a plurality of service provider profiles in a data store accessible by the services exchange medium;

maintaining a plurality of job posts in the data store, wherein each of the plurality of job posts is associated with a job to be completed within the service exchange medium;

providing a networked platform configured to connect a service provider with a buyer of the services exchange medium based on a profile of the service provider and a job post of the buyer, wherein the networked platform includes online resources configured to facilitate completion of a project by the service provider, wherein the project is associated with the job post of the buyer, wherein the online resources include an online escrow service and a private message board, wherein the private message board maintains a written record of communication between the buyer and the service provider, wherein the communication includes internal message board posts that originate from inside of the services exchange medium and external email exchanges that originate from outside of the services exchange medium to improve overall throughput of the computing device by reducing the total number of simultaneous client connections with the services exchange medium necessary for the maintenance of the written record, wherein the communication includes establishment of a plurality of tasks for the job, wherein each of the plurality of tasks is selectably associated with either a standard payment option or an escrow payment option;

interfacing with the online escrow service to pay for performance by the service provider of at least one of the plurality of tasks designated as using the escrow payment option;

automatically generating and transmitting to the buyer a request for funding of the at least one of the plurality of tasks designated as using the escrow payment option;

communicating with a remote account that is located outside of the services exchange medium, thereby resulting in a charge to the remote account, wherein the charge is associated with the request for funding;

periodically transmitting a status report to the buyer until the at least one of the plurality of tasks is completed;

automatically generating and transmitting to the buyer a notification of the service provider completing the at least one of the plurality of tasks;

transmitting an invoice for the at least one of the plurality of tasks, wherein all transmitted status reports are appended with the invoice;

releasing an asset for the at least one of the plurality of tasks from escrow; and transmitting a finished work product associated with the at least one of the plurality of tasks via the private message board.

20. A method of optimizing performance in a services exchange medium, comprising:

maintaining a plurality of buyer profiles and a plurality of service provider profiles in a data store hosted by the services exchange medium, wherein each buyer profile and each service provider profile is associated with a respective buyer and a respective service provider, and each service provider profile comprises service provider expertise associated with its respective service provider;

maintaining a plurality of job posts in the data store, wherein each of the plurality of job posts is associated with a job to be completed within the service exchange medium;

providing a networked platform configured to connect a selected service provider with a buyer of the services exchange medium, the selection based on the service provider expertise of the selected service provider profile and a job post of the buyer, wherein the networked platform includes online resources configured to facilitate completion of a project by the selected service provider, wherein the project is associated with the job post of the buyer, wherein the online resources include an online escrow service and a private message board, wherein the private message board maintains a written record of communication between the buyer and the service provider, wherein the communication includes internal message board posts that originate from inside of the services exchange medium and external email exchanges that originate from outside of the services exchange medium to improve overall throughput of the computing device by reducing the total number of simultaneous client connections with the services exchange medium necessary for the maintenance of the written record, wherein the communication includes establishment of a plurality of tasks for the job, wherein each of the plurality of tasks is selectably associated with either a standard payment option or an escrow payment option;

automatically generating and transmitting to the buyer a request for funding of the at least one of the plurality of tasks designated as using the escrow payment option;

communicating with a remote account that is located outside of the services exchange medium, thereby resulting in a charge to the remote account, wherein the charge is associated with the request for funding;

periodically transmitting a status report to the buyer until the at least one of the plurality of tasks is completed;

automatically generating and transmitting to the buyer a notification of the service provider completing the at least one of the plurality of tasks;

transmitting an invoice for the at least one of the plurality of tasks, wherein all transmitted status reports are appended with the invoice;

releasing an asset for the at least one of the plurality of tasks from escrow; and transmitting a finished work product associated with the task via the private message board.

* * * * *